(12) United States Patent
Terajima

(10) Patent No.: US 6,365,084 B1
(45) Date of Patent: *Apr. 2, 2002

(54) PROCESS FOR PRODUCTION A MOLDED PRODUCT

(75) Inventor: Yasuhide Terajima, Fuji (JP)

(73) Assignee: Yamakawa Industrial Co., Fuji (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,331

(22) Filed: May 11, 1998

Related U.S. Application Data

(62) Division of application No. 08/746,625, filed on Nov. 12, 1996, now Pat. No. 5,919,544.

(30) Foreign Application Priority Data

Nov. 14, 1995 (JP) .............................................. 7-295641

(51) Int. Cl.⁷ .............................................. B29C 43/20
(52) U.S. Cl. ........................ 264/257; 264/266; 264/274; 264/324
(58) Field of Search ................................ 264/257, 266, 264/274, 324, 259

(56) References Cited

U.S. PATENT DOCUMENTS

| | | | | |
|---|---|---|---|---|
| 1,482,045 A | * | 1/1924 | Stearns ........................ 264/266 |
| 1,895,738 A | * | 1/1933 | Shugg et al. |
| 2,158,044 A | * | 5/1939 | Haller ........................ 264/266 |
| 2,427,144 A | * | 9/1947 | Jansen ........................ 264/266 |
| 2,520,222 A |   | 8/1950 | Stone |
| 2,722,720 A | * | 11/1955 | Karniol ........................ 264/266 |
| 3,077,658 A | * | 2/1963 | Wharton ..................... 29/155.5 |
| 3,403,883 A | * | 10/1968 | Simko ........................ 249/95 |
| 3,651,191 A | * | 3/1972 | Glatt et al. .................. 264/266 |
| 3,699,204 A | * | 10/1972 | Ogata ......................... 264/154 |
| 4,076,790 A | * | 2/1978 | Lind ........................... 264/266 |
| 4,351,412 A |   | 9/1982 | Yamamuro et al. |
| 4,456,576 A | * | 6/1984 | Cotte .......................... 264/255 |
| 4,470,786 A | * | 9/1984 | Sano et al. .................. 425/125 |
| 4,752,059 A | * | 6/1988 | Oishi et al. .................. 249/95 |
| 4,794,750 A | * | 1/1989 | Schmidt et al. ............. 264/266 |
| 4,803,030 A | * | 2/1989 | Kobayashi .................. 264/278 |
| 4,832,150 A | * | 5/1989 | Just et al. .................... 181/175 |
| 4,956,139 A | * | 9/1990 | Koizumi et al. ............. 264/156 |
| 4,994,226 A | * | 2/1991 | Nakagawa et al. .......... 264/266 |
| 5,034,076 A | * | 7/1991 | Masui et al. ................. 156/79 |
| 5,154,872 A | * | 10/1992 | Masui et al. ................. 264/266 |
| 5,158,729 A | * | 10/1992 | Gemeinhardt et al. ...... 264/138 |
| 5,543,094 A | * | 8/1996 | Hara et al. ................... 264/266 |
| 5,618,567 A | * | 4/1997 | Hara et al. ................... 425/111 |

(List continued on next page.)

FOREIGN PATENT DOCUMENTS

| | | | | |
|---|---|---|---|---|
| EP | 0 255 509 A |   | 2/1988 | |
| EP | 0 577 123 A |   | 1/1994 | |
| EP | 0 582 075 A |   | 2/1994 | |
| JP | 401110131 | * | 4/1989 | ................. 264/220 |
| JP | A-6-15671 |   | 1/1994 | |
| JP | A-6-15672 |   | 1/1994 | |
| JP | A-6-15673 |   | 1/1994 | |
| JP | 07 237 234 A |   | 9/1995 | |
| JP | 08 156 141 A |   | 6/1996 | |
| JP | 08 252 828 A |   | 10/1996 | |

*Primary Examiner*—Jan H. Silbaugh
*Assistant Examiner*—Stefan Staicovici
(74) *Attorney, Agent, or Firm*—Oliff & Berridge, PLC

(57) ABSTRACT

A composite molded product has a main body molded of a base material of a thermoplastic resin and defining at least one through opening. A porous skin material is integrated with the main body by thermal fusing. At least one rib is formed on the surface of the skin material at a position corresponding to the position of at least one through opening. At least one rib is integrated with the main body through porous structure of the skin material.

13 Claims, 13 Drawing Sheets

U.S. PATENT DOCUMENTS

| | | | | |
|---|---|---|---|---|
| 5,628,029 A | * | 5/1997 | Souder et al. | 264/266 |
| 5,707,581 A | * | 1/1998 | Yamazaki | 264/266 |
| 5,759,464 A | * | 6/1998 | Matsumoto et al. | 264/266 |
| 5,759,476 A | * | 6/1998 | Steinbichler | 264/266 |
| 5,759,588 A | * | 6/1998 | Harada | 264/266 |
| 5,762,852 A | * | 6/1998 | Hettinga | 264/266 |
| 5,770,134 A | * | 6/1998 | Hara et al. | 264/266 |
| 5,783,132 A | * | 7/1998 | Matsumoto et al. | 264/324 |
| 5,795,526 A | * | 8/1998 | Matsumoto et al. | 264/266 |
| 5,811,053 A | * | 9/1998 | Ota et al. | 264/266 |
| 5,820,813 A | * | 10/1998 | Hara et al. | 264/266 |

* cited by examiner

PROCESS FOR PRODUCTION A MOLDED PRODUCT

This is a Division of application Ser. No. 08/746,625 filed Nov. 12, 1996 now U.S. Pat. No. 5,919,544. The entire disclosure of the prior application(s) is hereby incorporated by reference herein in its entirety.

BACKGROUND OF THE INVENTION

1. Field of the Invention

The present invention relates generally to a composite molded product, a production process and an apparatus therefor. More specifically, the invention relates to a composite molded article to be used as interior parts of a vehicle or so forth, exterior parts of an acoustic instrument or so forth, in which a skin material and a base member are integrally molded, a production process thereof, and an apparatus therefor.

2. Description of the Related Art

Conventionally, as interior parts of a vehicle or so forth, such as a lining of a vehicular door, a rear parcel shelf and so forth, a composite molded products, in which skin materials and base members are molded integrally, have been widely used.

On the other hand, in the recent years, for the purpose of enhancement of acoustic effect in a vehicular cabin or so forth, speakers are arranged in various positions in the vehicular cabin. In such a case, it is typical to preliminarily form an opening in the lining or so forth at a corresponding position to a speaker position and to fit a separately formed speaker cover or a speaker grill within the opening in order to affect for acoustic effect.

One example of a conventional rear parcel shelf is illustrated in FIGS. 10A and 10B. In FIG. 10A, a rear parcel shelf main body 100 is prepared as an intermediate product by bonding a skin material after molding a base body of a resin with openings 102 for acoustic speaker and an opening 104 for ventilation, or, in the alternative, by forming the openings 102 and 104 for the acoustic speaker and ventilation after molding the base body resin and the skin material simultaneously as a composite molded product. On the other hand, two speaker grills 106 and four ventilation grills (hereinafter referred to as "drafter grill") 108 are prepared separately and fixed in the openings 102 and 104 of the main body 100 by means of resin clips or so forth after engaging and positioning therein, for obtaining a finished product shown in FIG. 10B.

However, the method, in which the speaker grills and the drafter grills are formed separately from the rear parcel shelf main body, has no problem in the acoustic effect, but encounters a problem in complicatedness in color matching or so forth and in cost for requiring separate molding dies and so forth.

As a solution for the problems set forth above, there have been proposed technologies to perform formation of openings in the base member and integrally forming of the base member and the skin material, simultaneously, as disclosed in Japanese Patent Application Laid-Open Nos. Heisei 6-15671, Heisei 6-15672 and Heisei 6-15673.

Namely, the disclosed in the foregoing publications are directed to the molded product in which a base member formed with a through opening for passing a sound and a surface material are integrally molded in the form of including the through opening, or in the form of excluding the through opening, simultaneously.

However, in such a conventional skin material integrated composite molded product, when it is applied for a rear parcel shelf, the skin material is exposed over the entire surface of the base member. In this case, in order to assure sufficient strength required in view of durability for avoiding rupture and so forth by contacting with passengers, a diameter of the opening to be formed may be limited. On the other hand, for better propagation of acoustic vibration, it is preferred to have a greater opening ratio. In order to compromise these requirement, it becomes necessary to form a large number of small diameter openings.

For providing a large number of small diameter openings, it becomes inherent to provide forming pins and so forth in the number corresponding to number of openings to be formed. This makes forming dies complicated and results in high cost. Also, mold releasing characteristics is degraded to restrict material of the base member, board thickness and so forth.

Moreover, in the external appearance, at a portion corresponding to the speaker grill, only a flat skin material is present. As a result, there is no room for designing for obtaining a superior external appearance.

SUMMARY OF THE INVENTION

In view of the problems in the prior art as set forth above, it is an object of the present invention to provide a composite molded product which can assure sufficient strength of a skin material irrespective of a diameter of an opening, and permit optimal setting of an external appearance depending upon a portion to be applied.

Another object of the present invention is to provide a production process which can produce the above-mentioned composite molded product at low cost.

A further object of the present invention is to provide a production apparatus which can produce the above-mentioned composite molded product at low cost.

In a first aspect of the present invention, there is provided a composite molded product comprising:
 a main body formed of a base material of a thermoplastic resin and defining at least one through opening;
 a porous skin material integrally molded with the main body by thermal fusing; and
 at least one rib molded on a surface of the skin material at a position corresponding to the position of the at least one through opening, the rib being integrated with the main body through porous structure of the skin material.

Here, the main body may have at least one bridging member defining a plurality of through openings underlying the skin material, and the rib is arranged perpendicularly to the bridging member.

The at least one rib may be a plurality of parallel ribs.
The at least one rib may be a plurality of concentric ribs.
The at least one rib may be a mesh-shaped configuration, and the at least one bridging member is a honeycomb-shaped configuration.

The composite molded product may be used as an interior part of a vehicle.

The composite molded product may be used as an exterior part of an acoustic instrument.

In a second aspect of the present invention, there is provided a production process of a composite molded product comprising the steps of:
 providing a first molding die having at least one opening forming member projecting from a first forming surface and having a predetermined dimension in lengthwise direction;

providing a second molding die having at least one rib forming groove on a second forming surface at a position corresponding to a position of the at least one opening forming member;

arranging a porous skin material between the first and second forming dies;

supplying a base material of a thermoplastic resin at least before curing, into a cavity defined between the first and second molding dies at the first forming die side of the skin material; and clamping the first and second molding dies and applying a pressure for performing pressure molding.

The rib forming groove may be a length longer than the predetermined dimension in the length wise direction.

The opening forming member may be movable relative to the first molding die, and contacts with the second forming surface of the second molding die at initial stage of clamping step.

In a third aspect of the present invention, there is provided a producing apparatus for a composite molded product comprising:

a first molding die having at least one opening forming member projecting from a first forming surface and having a predetermined dimension in lengthwise direction;

a second molding die having at least one rib forming groove on a second forming surface at a position corresponding to a position of the at least one opening forming member;

supporting means provided in the second molding die for supporting a porous skin material; and pressurizing means for clamping the first and second molding dies and applying a pressure for performing pressure molding for a thermoplastic resin at least before curing in a cavity defined between the first and second molding dies.

The rib forming groove may be longer than the predetermined dimension in lengthwise direction.

The opening forming member may be movable relative to the first molding die, and contacts with the second forming surface of the second molding die at the initial stage of clamping of the first and second molding dies.

The opening forming member may comprise a plurality of pins arranged in parallel relationship with a given gap, and the rib forming groove is longer than a total dimension of the plurality of pins in lengthwise direction.

The first molding die may have a separately formed guide portion slidably guiding the opening forming member, and the second molding die has a separately formed exchangeable portion defining the rib forming groove.

The rib forming groove may be formed in a direction perpendicular to a direction along which the given gap between the plurality of pins extends.

The opening forming member may be formed with a predetermined pattern on a top surface thereof.

The rib forming groove may be in mesh-shaped configuration, and the predetermined pattern is a honeycomb-shaped groove.

As set forth above, with the present invention, the composite molded product is constructed with the main body formed of a base material with at least one through opening, the skin material integrated with the main body by thermal fusing, and at least one rib at the position corresponding to the through opening, which rib is integral with the main body, extended through the skin material, and formed simultaneously with the main body, the skin material can be protected satisfactorily irrespective of the size of the through opening. Furthermore, with the construction set forth above, greater freedom is provided in designing the composite molded product so that optimum external appearance can be selected depending upon application thereof. Furthermore, the composite molded product according to the present invention can be produced at low cost.

Also, in the preferred construction, a plurality of through openings are defined by at least one bridging member, and the rib is arranged perpendicularly to the bridging member. With such construction, the composite molded material superior in strength can be obtained.

Here, since the shape of the rib can be selected in wide variations, such as parallel straight ribs, concentric ribs, honeycomb-shaped rib, mesh-shaped rib and so forth, the range of selection of the configuration of the rib can be significantly widened depending on types of usage.

In the production process of the composite molded product set forth above, according to the present invention, the product is produced by arranging the skin material between a first (lower) molding die with at least one opening forming member projecting from the forming surface and having a dimension corresponding to the desired dimension of the opening, and a second (upper) molding die defining at least one rib forming groove, supplying the molten or at least non cured thermoplastic resin in the cavity defined between the first and second molding dies at the first molding die side of the skin material, and applying a pressure by clamping to perform pressure molding. Therefore, the molten or non-cured resin can be supplied in a condition where the die is held open, and the metsuke amount $(g/m^2)$ of the skin material can be minimized. Thus, the composite molded product can be formed easily at low cost.

The producing apparatus of the composite molded product according to the present invention is constructed with the first molding die having at least one opening forming member projecting from the forming surface and having dimension corresponding the opening to be formed, the second molding die having at least one rib forming groove at the position corresponding to the position of the opening forming member, a supporting member provided in the second molding die and supporting the porous skin material and a pressurizing means for clamping the first and second molding dies to apply a pressure to the non-cured thermoplastic resin in the cavity. Thus, desired composite molded product can be formed easily at low cost.

Also, in the preferred construction, since the length of the rib forming groove is set to be longer than the dimension in the lengthwise direction of the pin array, a flow efficiency of the resin into the rib forming groove can be higher to improve quality of the product.

In the further preferred embodiment, since the opening forming member is provided for movement relative to the first molding die to contact with the forming surface of the second molding die at the initial stage of clamping process, it makes unnecessary to adjust the distance between the opening forming member in the first molding die and the forming surface of the second molding die to facilitate formation of the opening.

In the preferred construction, the first molding die has a separately formed and exchangeably provided guiding portion which slidably guides the opening forming member, and the second molding die is provided a separately formed portion defining the rib forming groove so that configuration of the grill can be varied without exchanging entire die.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

Figure 1:
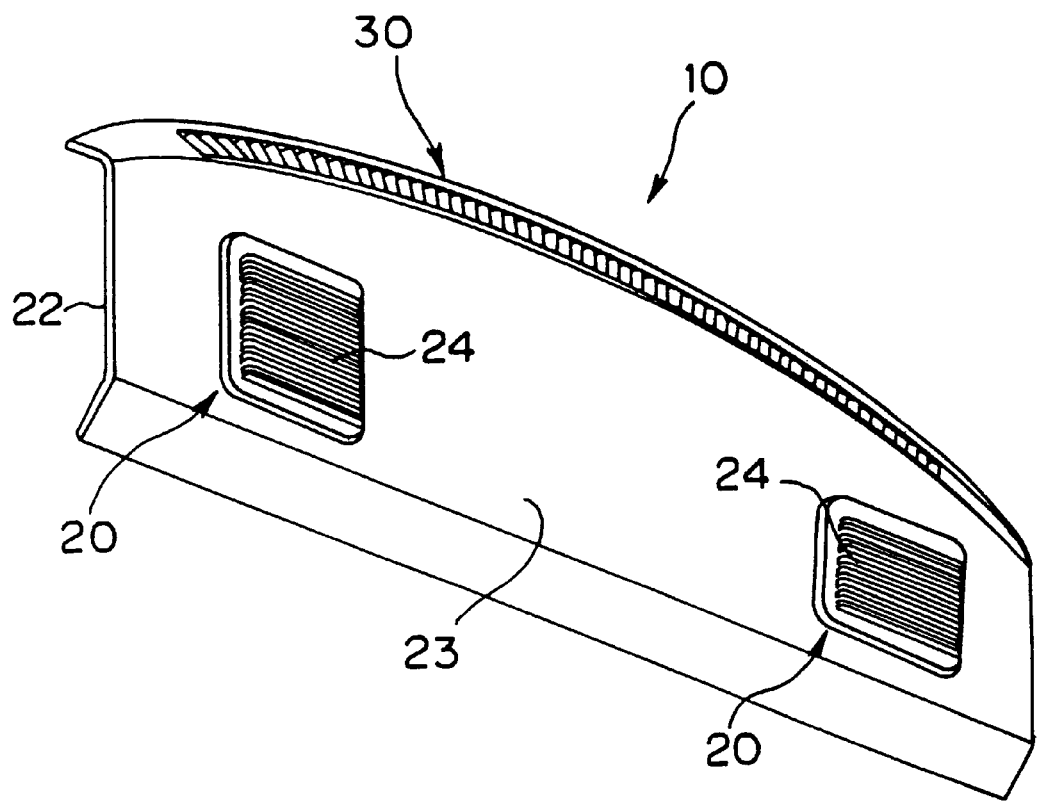
FIG. 1 is a perspective view showing a rear parcel shelf as one example of a composite formed product according to the present invention.

The present invention will be discussed hereinafter in detail in terms of the preferred embodiment of the invention with reference to the accompanying drawings. In the following description, numerous specific details are set forth in order to provide a thorough understanding of the present invention. It will be obvious, however, to those skilled in the art that the present invention may be practiced without these specific details. For instance, the features illustrated and described as part of one embodiment may be employed in other embodiments for creating further embodiments. It should be noted that throughout the disclosure, like reference numerals identify the same elements. In the disclosure, the term "rib" is used to represent a portion formed on a skin material irrespective of the configuration thereof. In other instance, well-known structures are not shown in order to avoid unnecessary obscure the present invention.

At first, as one example of a composite molded article according to the present invention, an embodiment as applied to a rear parcel shelf of an automotive vehicle will be discussed with reference to FIGS. 1 and 2.

Figure 2:
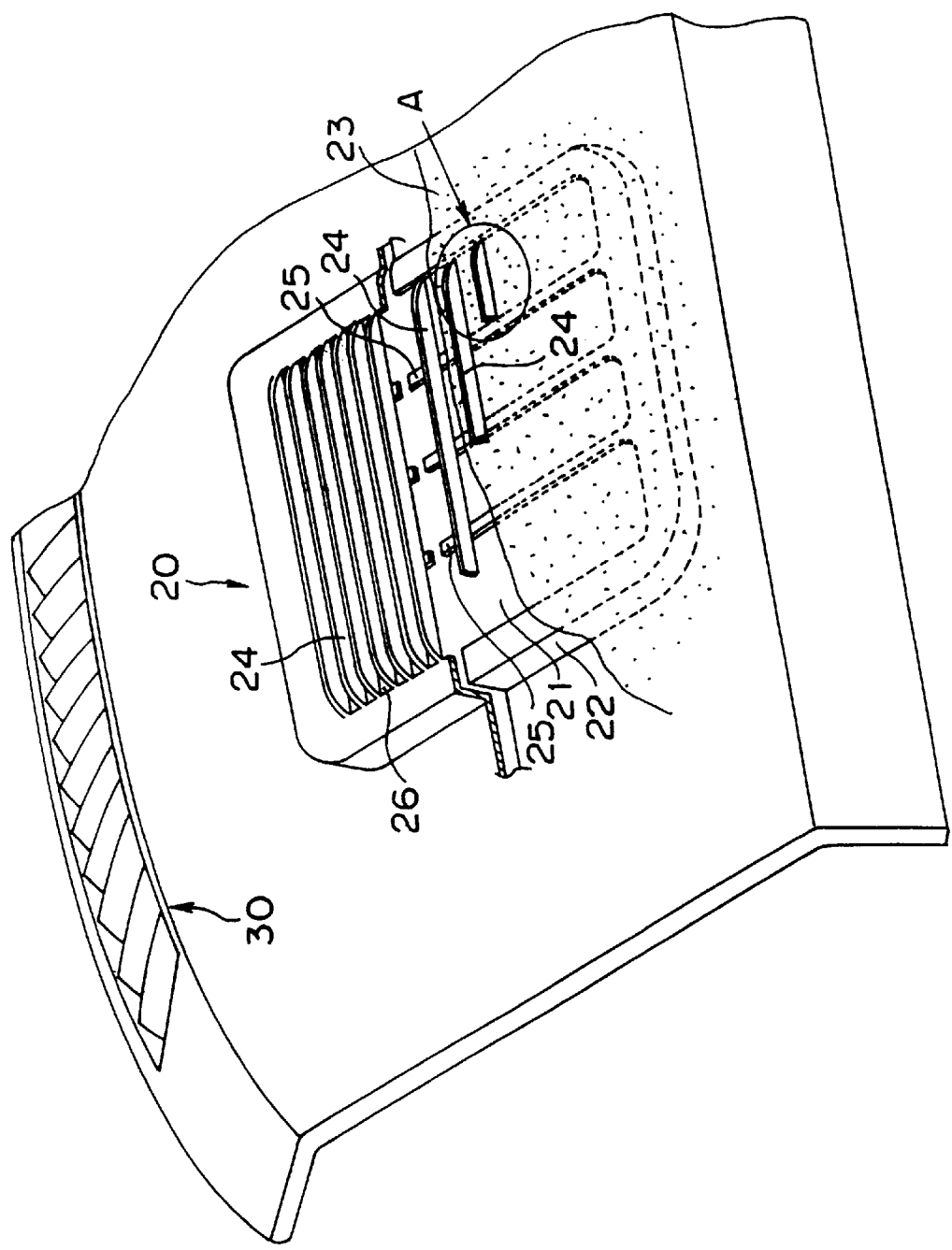
FIG. 2 is a partial enlarged perspective view of FIG. 1, illustrated with removing a part of a skin material and with neglecting a part of rib.

In FIGS. 1 and 2, reference numeral 10 denotes a rear parcel shelf, in which speaker grill portions 20 arranged symmetrically with respect to the longitudinal axis of a vehicle, and a drafter grill portion 30 formed along a rear end portion.

In the speaker grill portion 20, on a surface of a main body 22 which is constructed with a base material of a thermoplastic resin and includes a plurality (four in the shown embodiment) of through openings 21 (see FIG. 2), a porous skin material 23 is integrally molded by thermal fusing. A plurality of ribs 24 extending across the through openings 21 are formed of the same material as the base material, on the surface of the main body 22 partially through the porous structure of the skin material 23, simultaneously with the main body. It should be noted that while the skin material 23 is provided over the entire surface of the main body 22, FIG. 2 is illustrated with removing a part of the skin material 23 for facilitating clear understanding of the invention.

A plurality of through openings 21 are defined by bridging members 25. The bridging members 25 are arranged in parallel relationship with each other with a given interval. On the other hand, a plurality of ribs 24 are formed in parallel and spaced apart relationship to each other with a gap 26 of a given width. The ribs 24 extend in a direction perpendicular to the bridging members 25. Thus, a plurality of ribs 24 form louver in a form covering the underlying skin material 23.

The drafter grill 30 is provided with a plurality of ventilation openings and has a louver integrally molded with the skin material 23 on the surface of the main body 22.

The rear parcel shelf 10 constructed as set forth above is installed in the rear portion of a rear seat of the automotive vehicle. Speakers are arranged below the through openings 21. At this time, since the skin material 23 positioned over the through openings 21 are protected from contact with the passenger or luggage, the strength of the skin material 23 for durability becomes less important to permit formation of large through openings 21 superior in acoustic effect.

Size, number, shape and so forth of the ribs 24 can be arbitrarily set as discussed later together with size or so forth of the through opening 21.

Next, discussion will be given for a producing apparatus of the rear parcel shelf 10 as set forth above.

Figure 3:
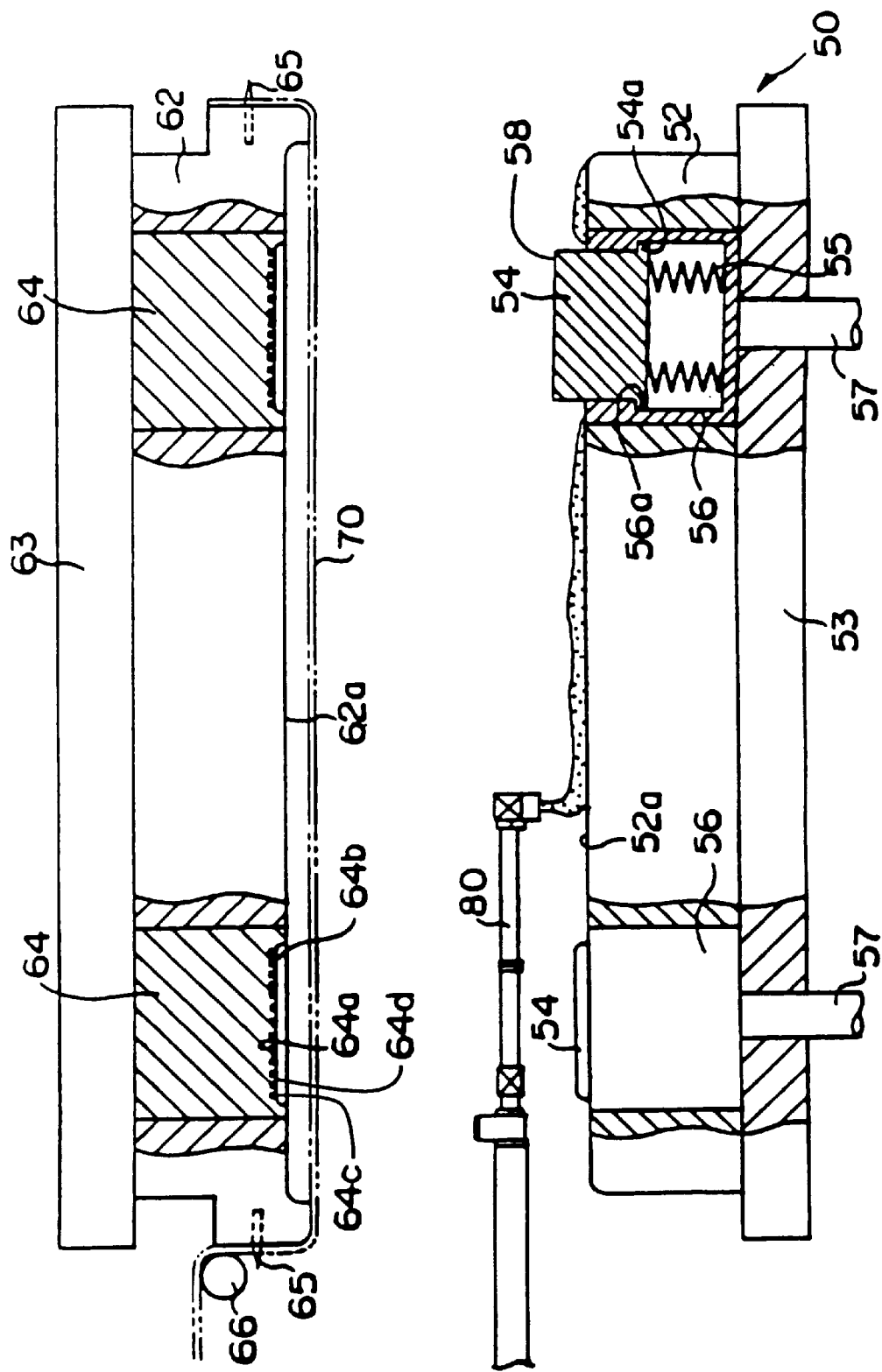
FIG. 3 is a partial section showing one embodiment of a production apparatus of the composite molded product according to the present invention, showing a condition where a mold is opened.

In FIG. 3, reference numeral 52 denotes a lower die as a first forming die which has a pin 54 as an opening forming member projecting from a forming surface and having a predetermined diametrical dimension. Reference numeral 62 denotes an upper die as a second forming die formed with a rib forming groove as discussed later on a forming surface at a position corresponding to the pin 54.

Upon clamping of the upper die 62 and the lower die 52, the pin 54 may be rigidly secured to the lower die 52 or integrally formed as a part of the lower die, as long as the top end of the pin 54 is projected from the forming surface 52a of the lower die 52 to contact with the forming surface of the upper die. In the shown embodiment, the pin 54 is provided movably relative to the lower die 52 and biased toward the upper die 62 by means of a spring 55. Thus, in the free condition of the lower die 52, the pin 54 is held in a position projecting from the forming surface 52a in a given magnitude set by restricting movement by engaging a flange 54a at the lower portion onto a stepped portion 56a of a knock out frame body 56 by means of the spring 55 disposed between a bottom portion of the knock out frame body 56 and the lower surface of the pin 54.

Also, the lower die 52 is fixed on a lower die base 53. A knock out rod 57 coupled with the knock out frame body 56 is arranged through the lower die base 53. The lower end of the knock out rod 57 is coupled with a not shown driving device so that the knock out frame body 56 is lifted up via the knock out rod 57 relative to the lower die 52 for enabling removal of the molded product from the die.

In FIG. 3, right side thereof shows projecting magnitude of the pin 54 in the free condition of the lower die 52 and left side thereof shows projecting magnitude of the pin 54 in the clamped condition.

The upper die 62 has a separately formed exchangeable grill forming die 64 which has a forming surface 64b formed with the rib forming groove 64a at a position corresponding to the knock out frame body 56. The upper die 62 and the grill forming die 64 are mounted on an upper die base 63 in a known manner, such as bolts and nuts. Reference numeral 65 denotes a needle member as a supporting means for supporting a porous skin material 70, which can be extracted and retracted, and 66 denotes a guide roller for guiding the skin material 70 supplied from a supply roll or so forth.

As shown, the pins 54 have a planar surface 58. The grill forming dies 64 that oppose the respective pins 54 comprise a rib forming groove 64a with a plurality of rib forming groove portions 64c. Each rib forming groove portion 64c is separated from at least one adjacent rib forming groove portion by a protrusion 64d. The planar surface 58 of each pin 54 faces a plurality of the rib forming groove portions 64c and the protrusions 64d separating the plurality of rib forming groove portions 64c.

Figure 4:
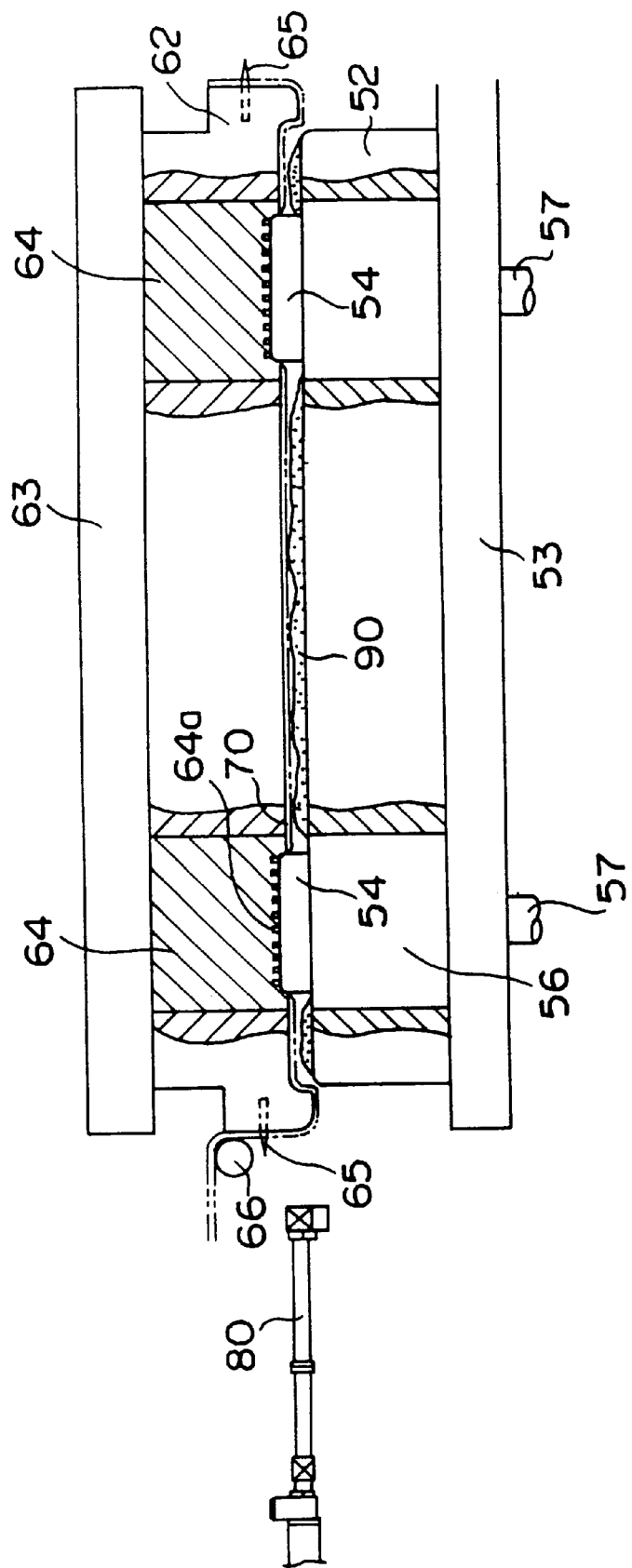
FIG. 4 is a partial section showing one embodiment of a production apparatus of the composite formed product according to the present invention, showing a condition immediately after closing of the mold.

It should be noted that, in FIGS. 3 and 4, the grill forming die 64 and the pin 54 are illustrated in a form rotated 90° in a plan view for facilitating clear understanding. Accordingly, when the product is produced by the shown molding die, the orientation of the rib 24 is offset for 90° in relation to the orientation of the rib shown in FIG. 1.

On the other hand, the pin 54 and the rib forming groove 64a are determined in number and shape adapting to the size, shape and so forth of the speaker grill portion 20 formed in the parcel shelf. Therefore, when the opening is small, the number of the rib forming groove 64a can be one or several, and only one pin 54 is arranged in the knock out frame body 56.

On the other hand, when the opening is large, in order to obtain sufficient strength of the rib 24 and smooth flow of the resin, it is preferred to provide a plurality of rib forming grooves 64a and the pins 54 in a following manner.

Figure 5:
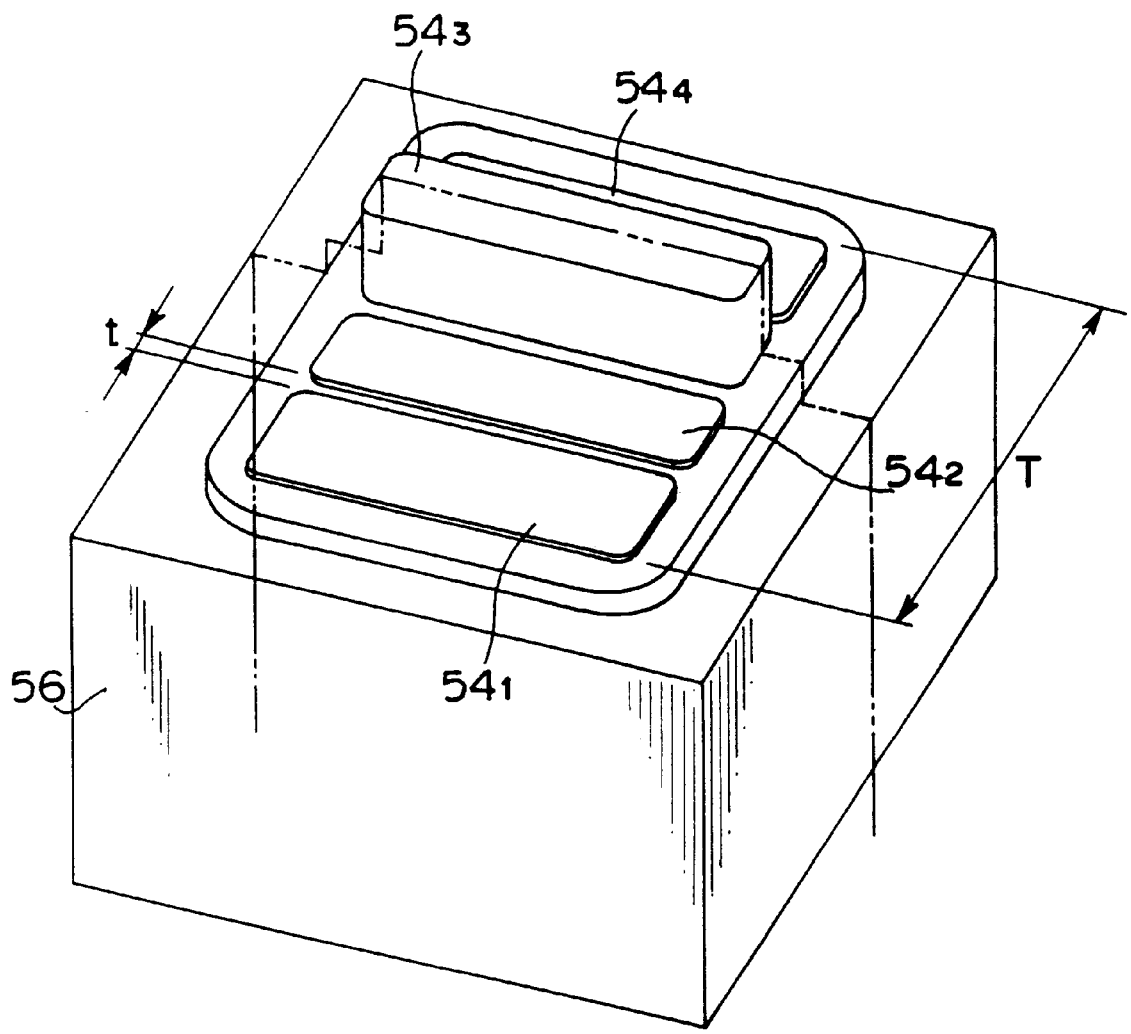
FIG. 5 is a perspective view showing one example of an opening forming member in one embodiment of the composite molded product producing apparatus according to the invention.
Figure 6:
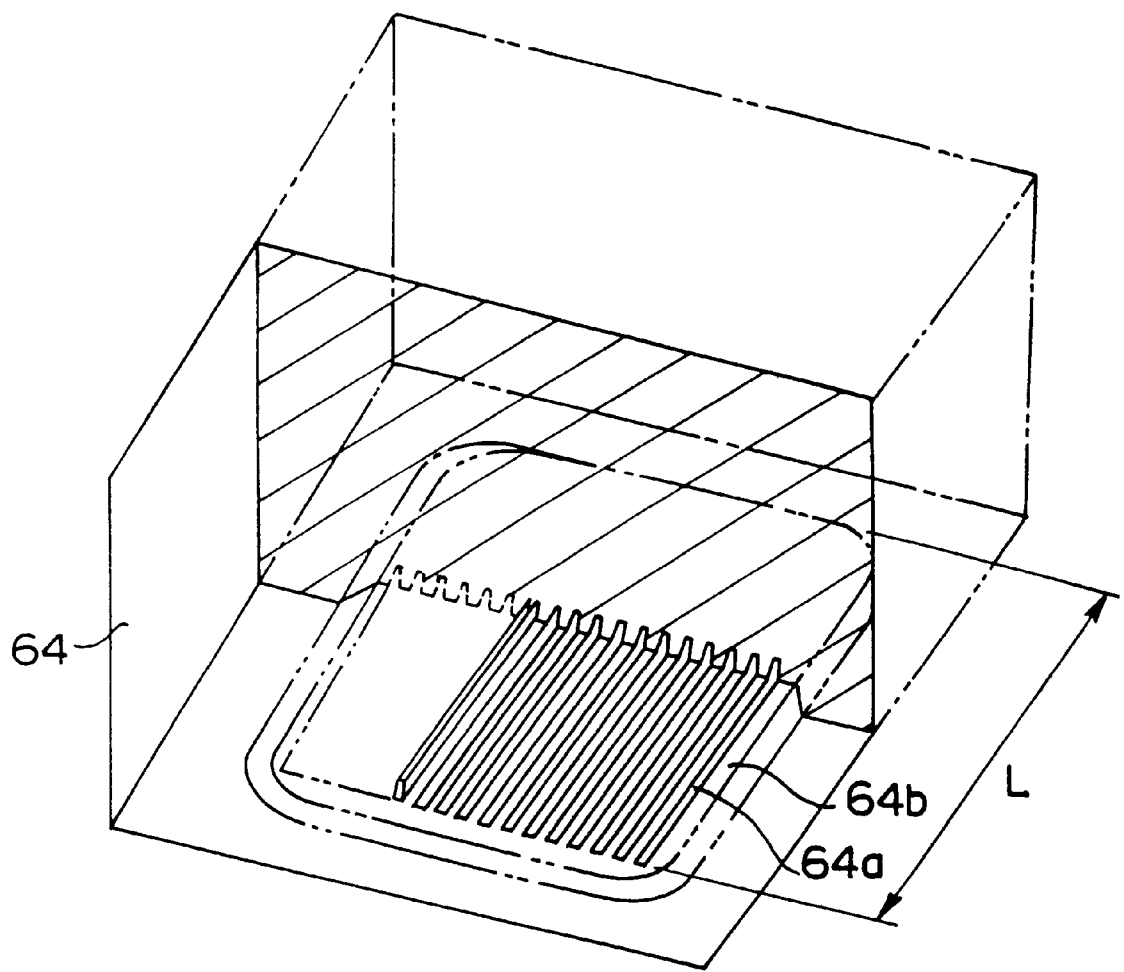
FIG. 6 is a perspective view showing one example of a grill forming mold in one embodiment of the composite molded product producing apparatus according to the invention.
Figure 7:
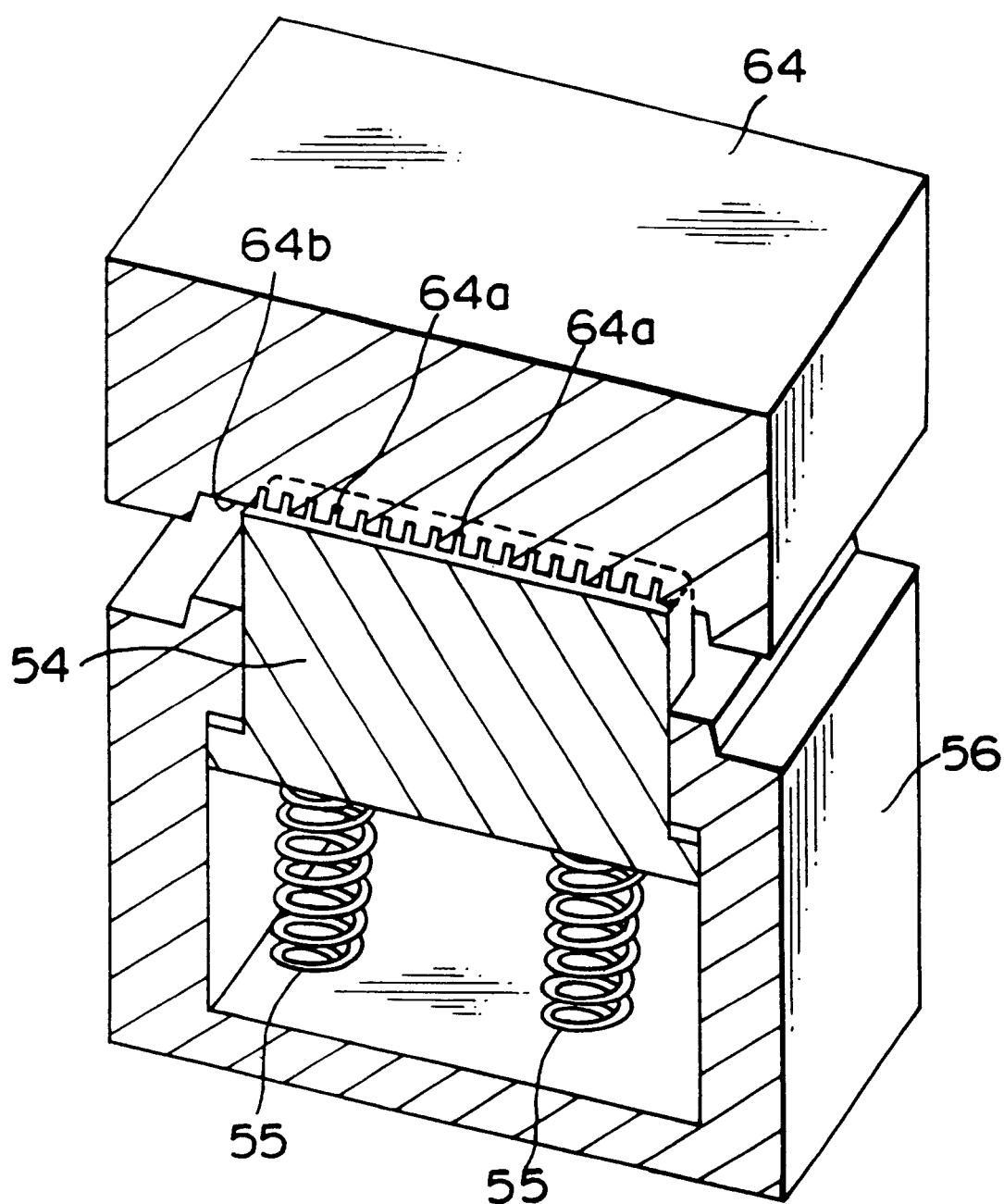
FIG. 7 is a sectional perspective view showing a contacting condition of the opening forming member of FIG. 5 and the grill forming mold of FIG. 6.

FIG. 5 shows an example, in which four pins 54 are arranged within the knock out frame body 56 in parallel relationship with a given interval t to form a pin array. Therefore, each pin 54 is formed into substantially rectangular shape in plan view. Assuming that a distance between the pins $54_1$ and $54_4$ located at both ends of the parallel arranged pin array, namely a dimension of the pin array in a direction of parallel arrangement of the pins, which direction will be hereinafter referred to as "lengthwise direction", is T, a length L of a plurality of rib forming groove's 64a of the grill forming die 64 corresponding thereto is set to satisfy L>T. It should be noted that a direction perpendicular to the lengthwise direction in the horizontal plane will be hereinafter referred to as "widthwise direction". Also, the rib forming grooves 64a are oriented in the lengthwise direction perpendicular to the direction of gaps extending between parallel arranged pins $54_1$ to $54_4$.

While a portion to form the drafter grill 30 is not illustrated, on either or both of the lower die 52 and the upper die 62, a plurality of projections in forms corresponding to ventilation openings are projected from forming surfaces 52a and 62a.

Returning to FIG. 3, reference numeral 80 denotes a supply nozzle of an extruder for supplying a thermoplastic resin as the base material on the forming surface 52a of the lower die 52.

It should be noted while it is neglected from illustration, the upper die 62 and the lower die 52 are respectively mounted on an upper die base 63 and a lower die base 53 and are loaded in a press molding apparatus. The press molding apparatus forms a pressurizing means for clamping the molding dies and pressing a molten thermoplastic resin in a cavity defined by the molding dies before curing.

Figure 11:
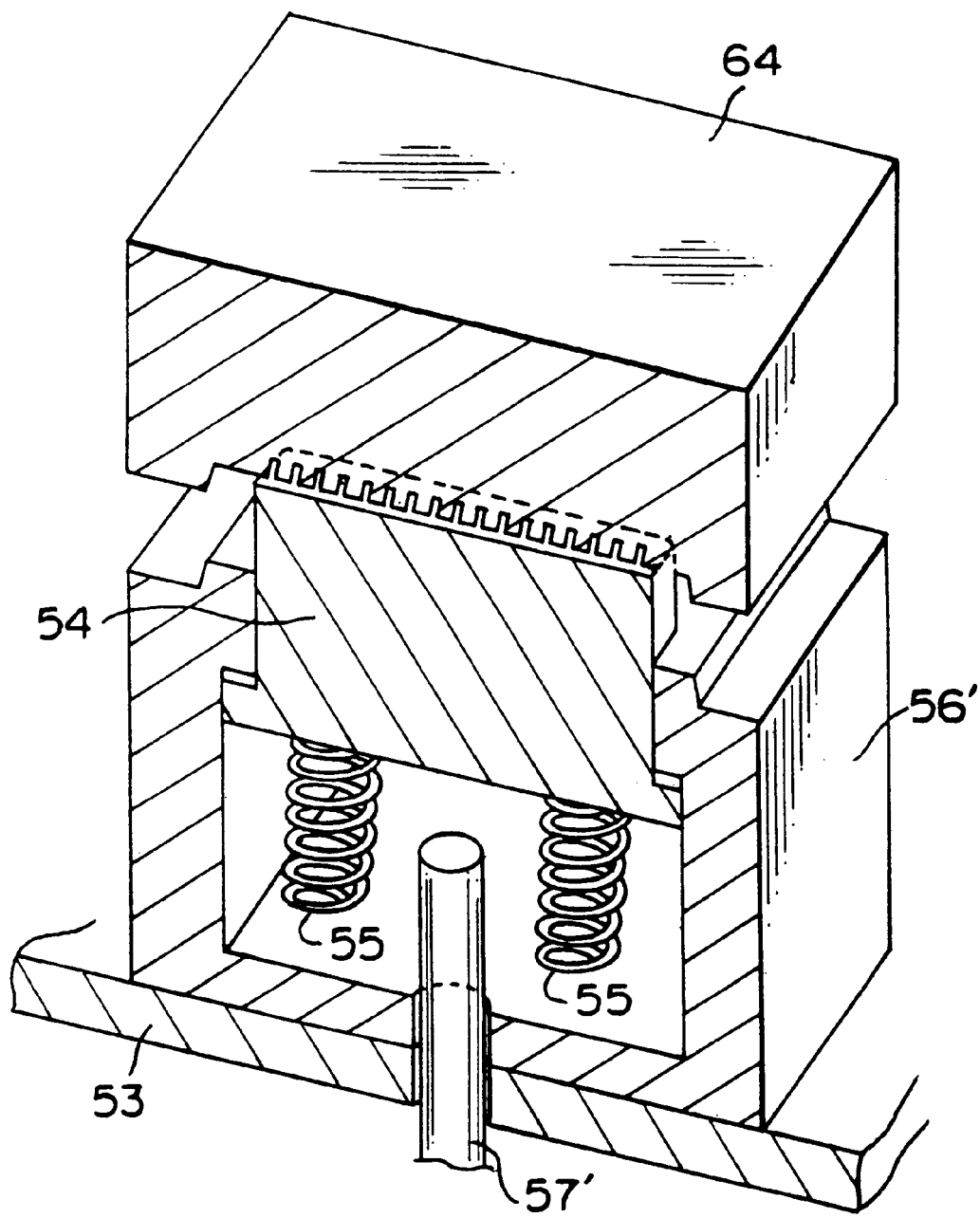
FIG. 11 is a sectional perspective view showing another embodiment of a knock out frame body and a knock out rod in one embodiment of the composite molded product producing apparatus according to the invention.

Here, another embodiment of the knock out frame body will be discussed with reference to FIG. 11. In the embodiment set forth above, the knock out frame body 56 and the knock out rod 57 are coupled. Such construction inherently causes a necessity of setting a set load of the spring 55 large. As a solution for this, in another embodiment, the knock out frame body and the knock out rod are not coupled with each other. Namely, the knock out rod 57' extends through the bottom portion of the knock out frame body 56' and the lower die base 53. The upper end of the knock out rod 57' is located at a lower predetermined position so as not to interfere movement of the pin 54. On the other hand, the lower end of the knock out rod 57' is coupled with a not shown driving device in a manner similar to that in the former embodiment. Thus, upon completion of molding process, by rising the pins 54 via the knock out rod 57' with respect to the knock out frame body 56' and the lower die 52, releasing of the molded product from the die can be done similarly to the former embodiment.

Next, discussion will be given for the production process of the composite molded product, i.e. the rear parcel shelf in the shown embodiments.

At first, as shown in FIG. 3, in a condition where the upper die 62 is opened, the skin material 70 is stretched to cover the entire forming surface 62a with temporarily tacking at both sides by means of needle members 65. Subsequently, with laterally shifting the supply nozzle 80, the thermoplastic resin as the base material is supplied on the forming surface 52a of the lower die 52. It is preferred to supply a greater amount of resin at a portion having greater thickness in the finished composite molded product. After shifting the supply nozzle 80 away from the die, the upper die 62 is lowered. Then, the pins 54 projecting from the lower die 52 in the predetermined magnitude contact with the forming surface 64b of the grill forming die 64 with lifting up the skin material 70. Substantially simultaneously therewith, the cavity between the lower die 52 and the upper die 62 is closed. Clamping is performed by further lowering the upper die 62. By this, the thermoplastic resin 90 is spread into the entire cavity and thus pressure molding is performed. The skin material 70 is flared by the thermoplastic resin 90 and fitted onto the forming surface 62a of the upper die except for the portion contacting with the forming surface 64b of the grill forming die 64. The thermoplastic resin 90 depressed onto the forming surface 62a of the upper die 62 penetrates into porous structure of the skin material 70 to be thermally welded with the skin material. Simultaneously, the thermoplastic resin in the vicinity of the pins 54 passes through the porous structure of the porous skin material 70 to enter into the rib forming grooves 64a of the grill forming die 64 on the surface of the skin material 70. On the other hand, at the portion of the drafter grill portion, the thermoplastic resin flows around the projections.

Subsequently, a cooling water is introduced through a not shown cooling water passage to cool the upper die 62 and the lower die 52. When the surface of the thermoplastic resin is cured to a certain extent which may maintain the configuration of the rear parcel shelf, the upper die 62 is lifted away from the lower die 52 to open the die. Thereafter, the knock out frame body 56 together with the pins 54 is projected or the pins 54 are projected through the knock out rods 57 or 57' to remove the finished rear parcel shelf as the composite molded product from the lower die 52.

Thus, the through openings 21 are formed in the main body 22 by the pins 54. The through openings 21 are covered by the skin material 23 (70) thermally welded to the bridging members 25 as well as the main body 22. Furthermore, on the surface of the skin material 70 at the position corresponding to the bridging members 25 and the through openings 21, a plurality of ribs 24 transversely extending across the through openings 21 are integrally formed, and in conjunction therewith, the drafter grill 30 is also formed integrally. Thus, the rear parcel shelf, in which all of the main body 22, the skin material, the speaker grills and the drafter grills are integrated, can be obtained.

Here, the mechanism of thermally fusing the skin material on the surface of the main body, and in conjunction therewith passing the thermoplastic resin through the porous structure of the skin material 70 to integrally mold the ribs 24, will be discussed in detail with reference to FIGS. 2, 8 and 9.

Figure 8:
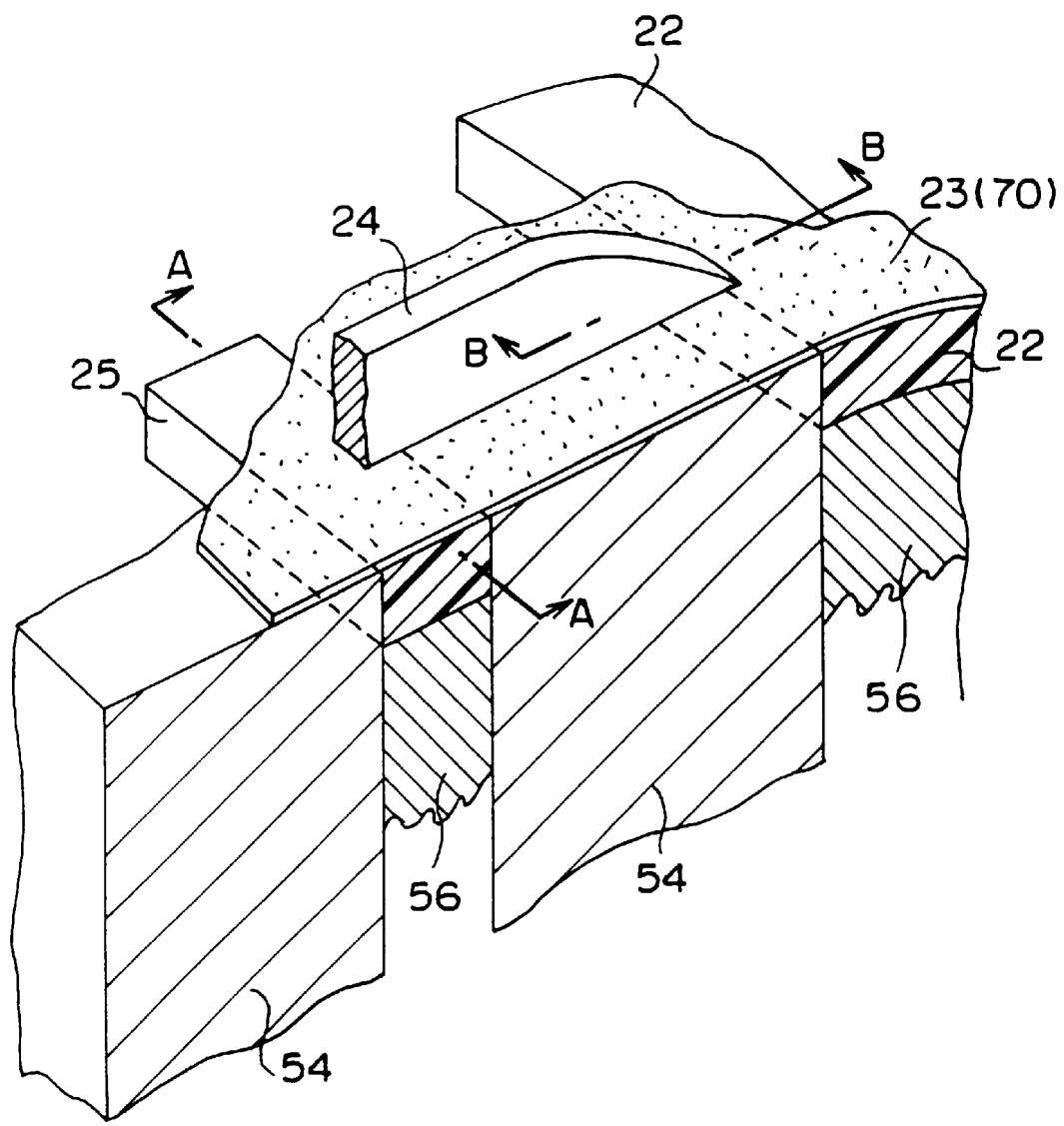
FIG. 8 is a partially cut-out and enlarged section of the portion A of FIG. 2.
Figure 9A:
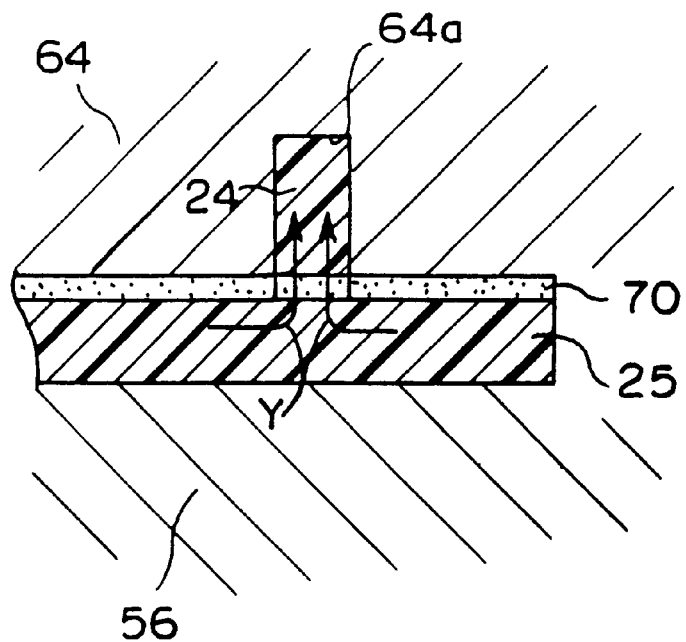
FIG. 9A is a section taken along line A—A of FIG. 8.
Figure 9B:
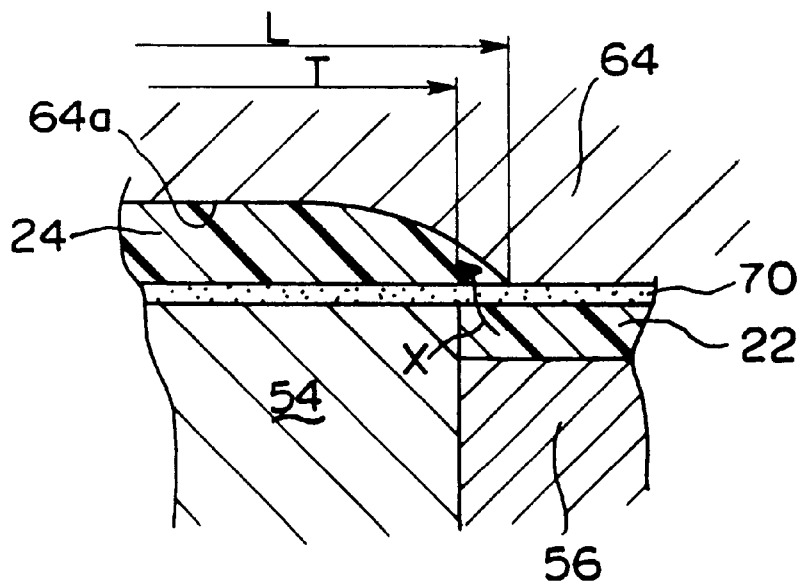
FIG. 9B is a section taken along line B—B of FIG. 8.
Figure 10A:
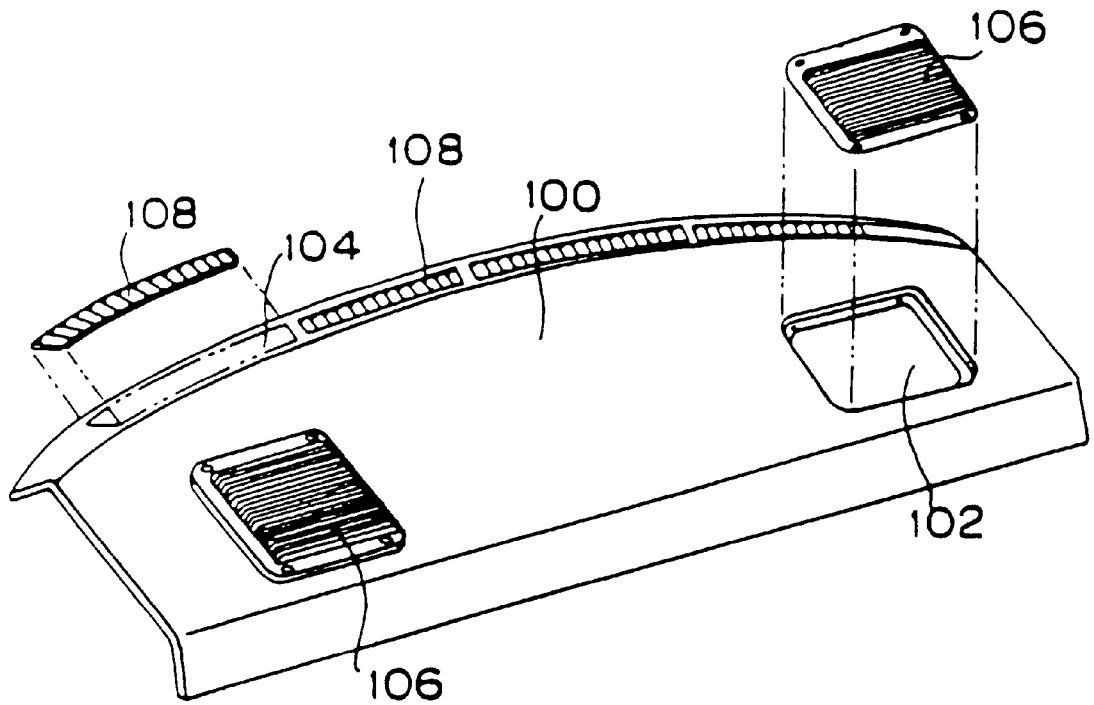
FIG. 10A is a perspective view of the conventional rear parcel shelf, showing an intermediate condition in assembling.
Figure 10B:
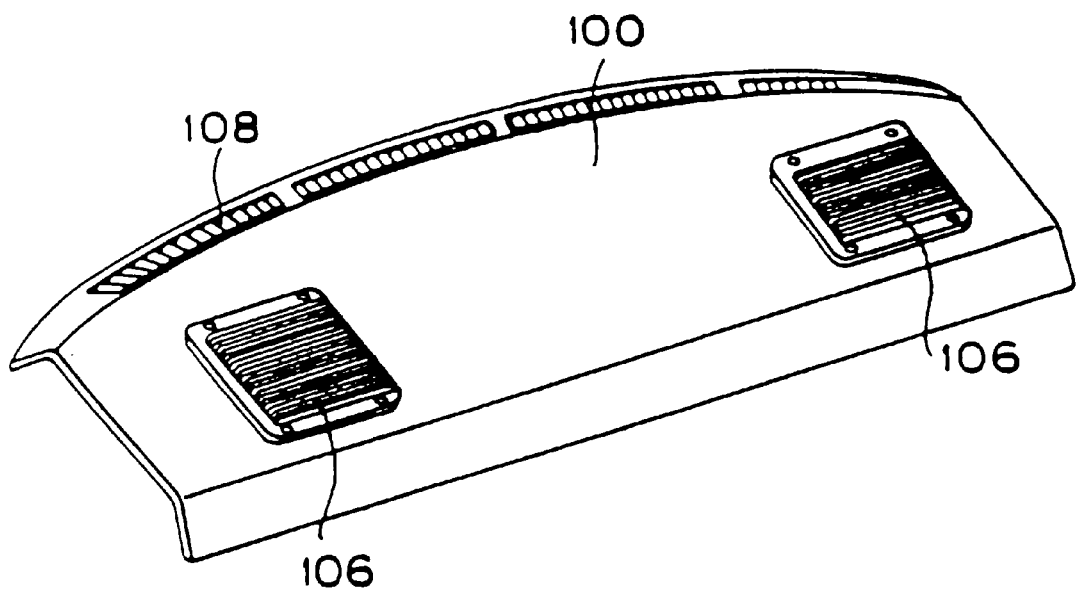
FIG. 10B is a perspective view of the conventional rear parcel shelf, as a finished product.

FIG. 8 is an enlarged and partially cut-out section of the portion A of FIG. 2, FIG. 9A is a section taken along line A—A of FIG. 8 and FIG. 9B is a section taken along line B—B of FIG. 8. As can be clear from FIG. 8, in the intervals between the parallel arranged pins 54 projecting from the knock out frame body 56, clearances or gaps are formed upon clamping. The molten thermoplastic resin flows into the gaps to form the bridging member 25 integrally with the main body 22. As set forth above, the ribs 24 are formed perpendicularly to the bridging member 25 and cover the underlying skin material 23 (70).

The ribs 24 are formed in the following manner. By the pressure upon clamping, the molten thermoplastic resin entering into the gaps (portions corresponding to the bridging member 25) passes through the porous structure of the skin material as shown by arrow Y to flow into the rib forming grooves 64a of the grill forming die 64. Also, at opposite ends of the plurality of pins 54, thermoplastic resin entering into a gap defined by step portion due to height difference of the top ends of the pin 54 and the knock out frame 56 passes through the porous structure of the skin material to enter into the grill forming grooves 64a of the grill forming die 64 as shown by arrow X.

As set forth above, arranging the intervals between parallel arranged pins and the rib forming grooves 64a so that the bridging members 25 and the ribs 24 are arranged perpendicularly with respect to each other, a flow path of the molten thermoplastic resin can be minimized to contribute for improvement of the product quality. Also, as can be clear from FIG. 9B, by providing greater length L for the rib forming groove 64a than the dimension T in the lengthwise direction of the overall pin array, the molten thermoplastic resin may also flow into the rib forming grooves 64a even through both end portions of the groove to make formation of the rib 24 efficient. It should be noted that when the length of the rib 24 is short, the relationship between the lengthwise dimension of the pin array and the length of the rib forming groove becomes less important.

It should be appreciated that the shape of the ribs to be formed on the surface side of the skin material 23 is not specified to the parallel rib configuration as illustrated but can be selected arbitrary.

Figure 12:
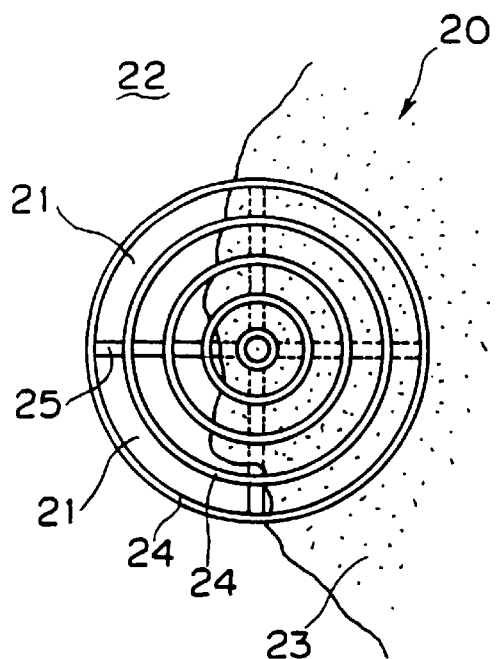
FIG. 12 is a plan view showing another embodiment of a speaker grill of the composite molded product according to the present invention, illustrated with removing a part of the skin material.

For instance, in the case of a circular speaker grill as shown in FIG. 12, the ribs 24 may be concentric circular configuration. In this case, a plurality of (four in the shown embodiment) bridging members 25 defining the through openings 21 may be arranged radially to intersect with the ribs 24 in a substantially perpendicular relationship. Also, while not illustrated, in this case, the four pins 54 for forming the through openings 21 are provided essentially fan shaped cross-section, and the grill forming die 64 is formed with concentrically arranged rib forming grooves 64a.

Figure 13:
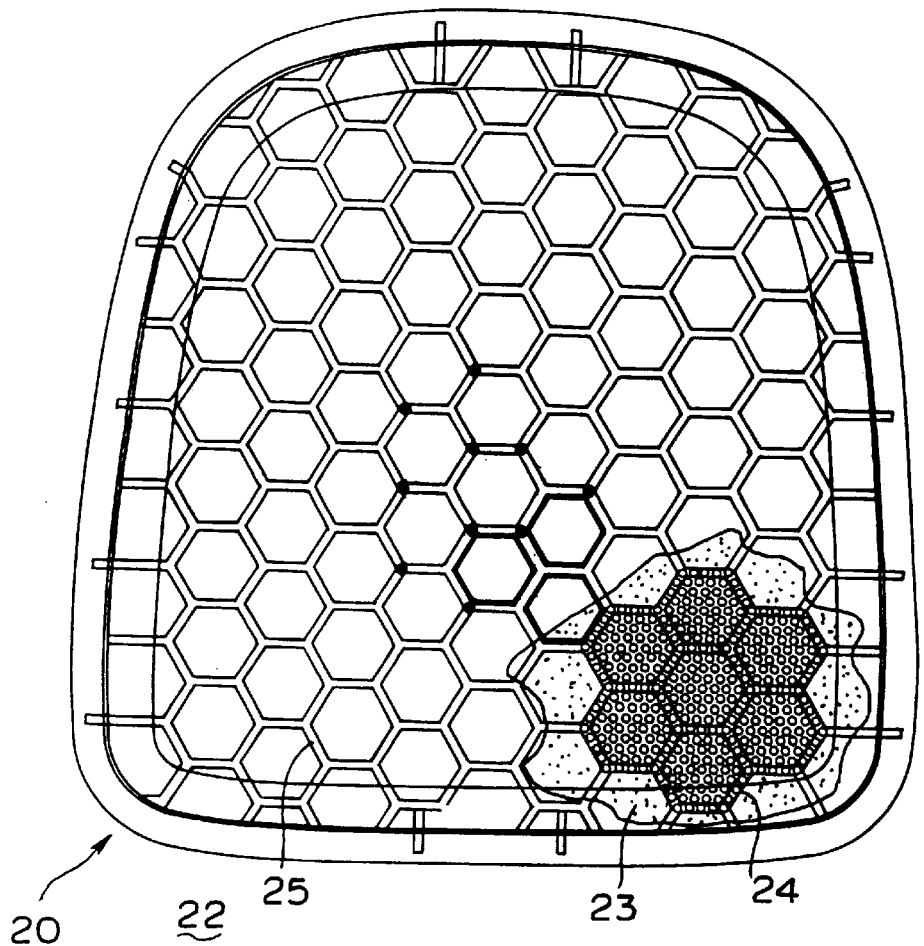
FIG. 13 is a plan view showing a further embodiment of a speaker grill of the composite formed product according to the present invention, illustrated with removing a part of the skin material.
Figure 14:
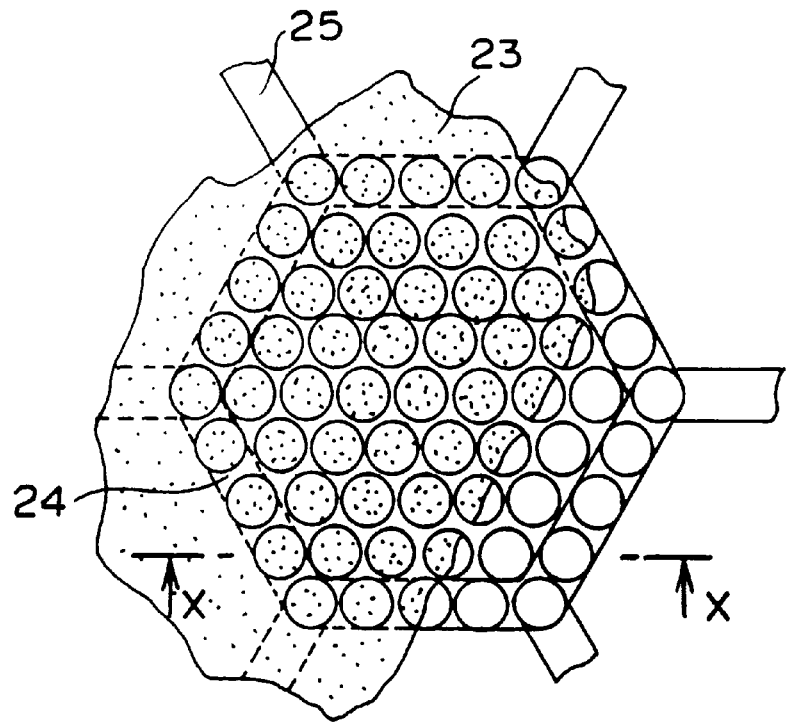
FIG. 14 is a partial enlarged view of FIG. 13, illustrated with removing a part of the skin material and the rib.
Figure 15:
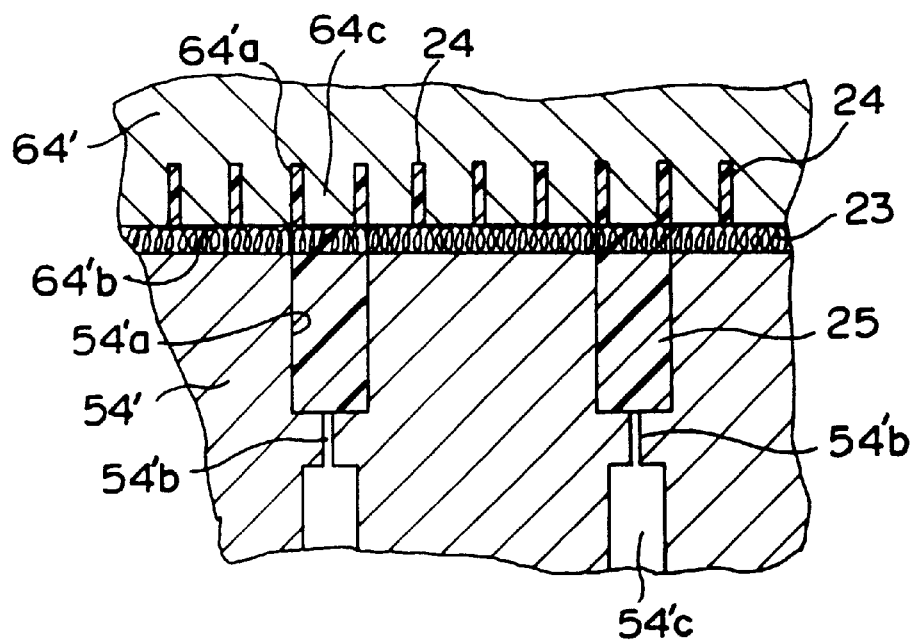
FIG. 15 is a section taken along line X—X of FIG. 14, which is illustrated together with the mold for forming the shown portion of the product.

Also, FIG. 13 shows another embodiment, the speaker grill 20 is formed into horseshoe shaped configuration, the bridging member 25 underlying the skin material 23 is formed into honeycomb configuration which is superior in strength, and the rib 24 to be formed on the surface of the skin material is mesh-shaped configuration. In the shown embodiment, in order to form mesh-shaped rib 24, the grill forming die 64' is provided with a plurality of regularly arranged cylindrical projections 64c projecting from the rib forming surface 64'b to define rib forming groove 64'a between adjacent cylindrical projections 64c. Also, in order to form the honeycomb-shaped bridging member 25, a single large pin 54' is employed. The pin 54' is formed with honeycomb-shaped groove 54'a on the top surface. At several positions in the bottom of the honeycomb groove 54'a in the center portion of the horseshoe-shaped speaker grill 20 (see FIG. 13), the honeycomb groove 54'a is communicated with a ventilation holes 54'c via orifices 54'b. The ventilation holes 54'c are connected to a not shown vacuum pump.

Thus, upon pressure molding after supplying the molten thermoplastic resin, molding is performed with ventilating the air in the die through several positions in the bottom portion of the honeycomb-shaped groove 54'a located at center portion of the speaker grill 20. This assures distribution of the molten thermoplastic resin through the mesh-shaped rib forming groove 64'a and the honeycomb-shaped groove 54'a, uniformly.

Concretely, preferred thermoplastic resin as the base material may be polypropylene, polyethylene or so forth. In view of the penetration ability for the porous skin material discussed later, the material having melt index (MI) value of 20 to 60 g/10 min., more preferably 30 to 60 g/10 min may be used. While a material having a low flow ability is advantageous in strength, the material having the above-identified MI value is preferred for necessity of penetration through the skin material, in the present invention.

On the other hand, as the porous skin material is specified to those having fluid permeability, such as a woven fabric, knit, non-woven fabric of polypropylene fiber, polyester fiber and so forth, or so forth. Interior materials of automotive vehicle, such as leather, vinyl chloride and so forth are in appropriate. Amongst preferred materials, non-woven fabric, tricot are particularly preferred. Examples to be judged as applicable through experiments will be listed in the following table 1.

TABLE 1

In the case of non-woven fabric:

| | Kind | Material | Metsuke (g/m$^2$) |
|---|---|---|---|
| a | Plane | polypropylene polyethyleneterephthale | 100 to 300 |
| b | Velour | polypropylene polyethyleneterephthale | 100 to 300 |
| c | Raised Needle | polypropylene polyethyleneterephthale | 100 to 300 |

It should be noted that as one example of a) of the table 1, MK88 (polypropylene 100%, Metsuke 300 g/m$^2$) available from Japan Bairin K. K., as one example of b) of the table 1, MH55 (polyethylene terephthalate 100%, Metsuke 250 g/m$^2$) available from Japan Bairin K. K. and as one example of c) of the table 1, tradename "Carmat" (polyethylene terephthalate 100%, Metsuke 300 g/m$^2$) available from Toyo Boseki K. K. can be listed.

In the case of tricot, Metsuke in a range of 180 to 250 g/m$^2$ was preferred.

Upon molding by employing the base material and the skin material, it is confirmed that molding temperature and molding pressure of the thermoplastic resin are respectively in a range of 180 to 200° C. and higher than or equal to 50 kg/cm$^2$ in view of constraint that the skin material is not molten, permeability to the skin material of the base material in the portion where the speaker grill is formed, and restricting exuding to the surface of the skin material in the portion other than the grill forming portion. A pressurizing period fluctuates slightly depending upon the temperature of the thermoplastic resin of the base material, but favorable result can be obtained in a range of 20 to 25 sec.

On the other hand, in the case of different combination of the base material and the skin material, it is confirmed that the same molding condition is applicable for combination of polypropylene as base material and polyethylene terephthalate as surface material and vis-a-vis.

It is possible that the base material having lower flow ability is employed or the skin material having smaller metsuke is employed for the purpose of lowering of production cost. When the base material having MI value in a range of 20 to 30 g/10 min., the molding temperature is set at higher temperature, at 200° C. On the other hand, when a non-woven fabric having metsuke amount smaller than or equal to 150 g/m$^2$ and down to 100 g/m$^2$, the base material having MT value of 60 g/10 min. is to be employed and the molding temperature is set to be lower at 180° C.

On the other hand, it is confirmed that when the pin 54 is movable relative to the lower die 52 and pressurization is to be performed in the above-mentioned molding pressure condition, a necessary total biasing force for preventing the pin 54 from lowering (away from the speaker grill forming surface) has to be set in a range of 10 to 20 tons.

It is further confirmed that the preferred cross-sectional shape of the parallel or concentric rib 24 is substantially isosceles triangular configuration in view of die releasing characteristics. Furthermore, it is confirmed that greater than or equal to 2 mm in thickness at the bottom portion and shorter than or equal to 10 mm in height are preferred in view of formability.

In the case of the construction with the mesh-shaped rib and honeycomb-shaped bridging member, and when a longer side dimension of the speaker grill 20 is approximately 20 cm, the rear parcel shelf with good external appearance can be obtained by setting the pitch of the cylindrical projections of 1.8 mm diameter at 2.6 mm, and setting the thickness of the bridging member at about 1.9 mm.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

For instance, while the foregoing discussion has been given in terms of the automotive rear parcel shelf as the composite molded product, the present invention is also applicable for vehicular interior material, such as a lining of the vehicular door, and exterior material of acoustic instruments, for which similar functions are required.

What is claimed is:

1. A production process of a composite molded product comprising the steps of:
   providing a first molding die having at least one opening forming member projecting from a first forming surface and having a predetermined dimension in a lengthwise direction;
   providing a second molding die having at least one rib forming groove on a second forming surface at a position corresponding to a position of said at least one opening forming member;
   arranging a porous skin material between said first and second molding dies;
   supplying a base material of a thermoplastic resin at least before curing, into a cavity defined between said first and second molding dies on said first molding die side of said skin material to form a main body; and
   clamping said first and second molding dies and thereby applying a pressure for performing pressure molding, said at least one opening forming member contacting said second forming surface at the position of said at least one rib forming groove, with said skin material therebetween, allowing a part of said base material to flow into said at least one rib forming groove through said porous skin material to form at least a rib over said porous skin material on said second molding die side of said skin material.

2. A production process as set forth in claim 1, wherein said rib forming groove has a length longer than said predetermined dimension in the lengthwise direction.

3. A production process as set forth in claim 1, wherein said opening forming member is movable relative to said first molding die, and contacts with said second forming surface of said second molding die at an initial stage of the clamping step.

4. The production process of claim 1, wherein said at least one rib forming groove has a dimension greater than said predetermined dimension of said at least one opening forming member in said lengthwise direction.

5. The production process of claim 1, wherein the composite molded product is an interior part of a vehicle.

6. The production process of claim 1, wherein the composite molded product is a rear parcel shelf of a vehicle.

7. The production process of claim 1, wherein the composite part is an exterior part of an acoustic instrument.

8. A process for producing a composite molded product, comprising:

providing a first molding die including at least one opening forming member projecting from a first forming surface, each opening forming member having a planar surface;

providing a second molding die including a plurality of rib forming groove portions on a second forming surface, each rib forming groove portion being separated from at least one adjacent rib forming groove portion by a protrusion, the planar surface of each opening forming member facing a plurality of the rib forming groove portions and the protrusions separating the plurality of rib forming groove portions;

arranging a porous skin material between the first and second molding dies;

supplying a base material of a thermoplastic resin at least before curing, into a cavity defined between the first and second molding dies on the first molding die side of the skin material to form a main body; and clamping the first and second molding dies and thereby applying a pressure for performing pressure molding, said at least one opening forming member contacting said second forming surface at said plurality of rib forming groove portions with said skin material therebetween, such that a portion of the base material flows into the plurality of rib forming groove portions through the porous skin material to form a plurality of ribs.

9. The process of claim 8, wherein the part of the base material that flows into the plurality of rib forming groove portions through the porous skin material forms a plurality of ribs over the porous skin material on the second molding die side of the skin material.

10. The process of claim 8, wherein the second molding die comprises a plurality of rib forming groove portions at each of two spaced locations on the second forming surface, the first forming surface of the first molding die includes two spaced planar surfaces that each face a plurality of the rib forming groove portions and the protrusions separating the plurality of rib forming groove portions.

11. The production process of claim 8, wherein the composite molded product is an interior part of a vehicle.

12. The production process of claim 8, wherein the composite molded product is a rear parcel shelf of a vehicle.

13. The production process of claim 8, wherein the composite part is an exterior part of an acoustic instrument.

* * * * *